United States Patent
Leachman et al.

(10) Patent No.: US 10,926,861 B2
(45) Date of Patent: Feb. 23, 2021

(54) PUCK COVER

(71) Applicant: Bell Helicopter Textron Inc., Fort Worth, TX (US)

(72) Inventors: Joseph Daniel Leachman, Keller, TX (US); Danielle Vann, Hurst, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 351 days.

(21) Appl. No.: 15/997,547

(22) Filed: Jun. 4, 2018

(65) Prior Publication Data
US 2019/0367149 A1     Dec. 5, 2019

(51) Int. Cl.
*B64C 1/20*     (2006.01)
*B64D 11/06*     (2006.01)
*B64C 27/04*     (2006.01)

(52) U.S. Cl.
CPC .............. *B64C 1/20* (2013.01); *B64C 27/04* (2013.01); *B64D 11/0601* (2014.12); *B64D 11/0696* (2013.01)

(58) Field of Classification Search
CPC .......... B64C 1/18; B64C 1/20; B64D 11/0696
See application file for complete search history.

(56) References Cited

U.S. PATENT DOCUMENTS

| | | |
|---|---|---|
| 2,559,548 A | 7/1951 | Seigneur |
| 2,957,196 A | 10/1960 | Kreider et al. |
| 3,017,673 A | 1/1962 | Biris |
| 3,579,942 A | 5/1971 | Cole |
| 3,892,099 A | 7/1975 | Worgan et al. |
| 4,501,404 A | 2/1985 | Nelson |
| 4,577,450 A * | 3/1986 | Large ................... B64C 1/18 411/369 |
| 5,240,543 A | 8/1993 | Fetterhoff et al. |
| 5,259,575 A | 11/1993 | Cabrera |
| 6,152,401 A | 11/2000 | Green |
| 6,264,412 B1 | 7/2001 | Nakamura et al. |
| 6,488,460 B1 | 12/2002 | Smith et al. |
| D490,767 S * | 6/2004 | Nagasawa ................ D12/400 |
| 7,578,551 B2 | 8/2009 | Liñero |
| D617,178 S * | 6/2010 | Sakai ........................ D8/382 |

(Continued)

FOREIGN PATENT DOCUMENTS

| | | |
|---|---|---|
| CN | 201354072 | 12/2009 |
| DE | 826549 | 1/1952 |

(Continued)

OTHER PUBLICATIONS

USPTO Non-Final Office Action for U.S. Appl. No. 15/405,246 dated Mar. 12, 2020.

(Continued)

*Primary Examiner* — Richard G Davis
(74) *Attorney, Agent, or Firm* — Patent Capital Group

(57) ABSTRACT

In an example, a puck configured to be embedded in a structure of a rotorcraft creates a cavity in the structure and includes an attachment post for coupling a component to the structure in which the puck is embedded. A puck cover can be configured to cover the cavity in the structure and the puck cover can include a top cover surface to cover the cavity, a center support, and plurality of extensions, where the plurality of extensions coupled with the attachment post.

20 Claims, 14 Drawing Sheets

(56) References Cited

U.S. PATENT DOCUMENTS

| | | |
|---|---|---|
| 8,336,939 B2 | 12/2012 | Green et al. |
| 8,544,796 B2 | 10/2013 | Pozzi et al. |
| 8,568,072 B2 | 10/2013 | Suefuji et al. |
| 8,709,584 B2 | 4/2014 | Carstensen et al. |
| 9,140,279 B2 | 9/2015 | Frias |
| 9,764,663 B2 | 9/2017 | Lee |
| 9,862,166 B2 | 1/2018 | Lopez et al. |
| 9,976,583 B2 | 5/2018 | Lopez et al. |
| 10,197,078 B2* | 2/2019 | Richardson ............ F16B 37/122 |
| 10,604,262 B2 | 3/2020 | Carr et al. |
| 10,625,866 B2 | 4/2020 | Emrich et al. |
| 2003/0143052 A1 | 7/2003 | Fehrle et al. |
| 2003/0209929 A1 | 11/2003 | Muin et al. |
| 2004/0195450 A1 | 10/2004 | Hiesener |
| 2005/0001098 A1 | 1/2005 | Saint-Jalmes |
| 2007/0040434 A1 | 2/2007 | Plant |
| 2007/0193146 A1 | 8/2007 | Carstensen et al. |
| 2008/0213034 A1 | 9/2008 | Wood et al. |
| 2008/0231092 A1 | 9/2008 | Silva |
| 2010/0327123 A1 | 12/2010 | Smith et al. |
| 2011/0042514 A1 | 2/2011 | Ehlers et al. |
| 2011/0220267 A1 | 9/2011 | Blancaneaux et al. |
| 2012/0304579 A1* | 12/2012 | Dezoete ................ B64C 1/18 52/582.2 |
| 2014/0265513 A1 | 9/2014 | Lambert |
| 2014/0311038 A1* | 10/2014 | Iwahara ................ B62D 25/24 49/466 |
| 2015/0048206 A1 | 2/2015 | Deloubes |
| 2015/0210393 A1 | 7/2015 | Savian |
| 2015/0336485 A1 | 11/2015 | Lee |
| 2015/0360779 A1 | 12/2015 | Behrens et al. |
| 2016/0107753 A1 | 4/2016 | Toktas et al. |
| 2017/0036750 A1 | 2/2017 | Lewis et al. |
| 2017/0080674 A1 | 3/2017 | Patel et al. |
| 2017/0253006 A1 | 9/2017 | Lopez et al. |
| 2018/0038399 A1 | 2/2018 | Fischer et al. |
| 2018/0194451 A1 | 7/2018 | Cosby et al. |
| 2018/0194473 A1 | 7/2018 | Emrich et al. |
| 2018/0194478 A1 | 7/2018 | Carr et al. |
| 2018/0327074 A1 | 11/2018 | Mills et al. |
| 2019/0009882 A1 | 1/2019 | Mills et al. |
| 2019/0092478 A1 | 3/2019 | Gilbert |
| 2019/0093812 A1* | 3/2019 | Yamada ............. F16L 55/1612 |

FOREIGN PATENT DOCUMENTS

| | | |
|---|---|---|
| EP | 2783984 A1 | 10/2014 |
| EP | 3348469 A1 | 7/2018 |
| EP | 3348475 A1 | 7/2018 |
| EP | 3348479 A1 | 7/2018 |
| EP | 3348479 B1 | 10/2019 |
| EP | 3348475 B1 | 3/2020 |
| EP | 3348469 B1 | 4/2020 |
| EP | 3578456 B1 | 7/2020 |
| GB | 2307671 A | 6/1997 |
| WO | 2011077366 A1 | 6/2011 |
| WO | 2015094968 A1 | 6/2015 |

OTHER PUBLICATIONS

USPTO Non-Final Office Action for U.S. Appl. No. 15/405,271 dated Jul. 11, 2019, 9 pages.
USPTO Final Rejection for U.S. Appl. No. 15/405,246 dated Dec. 5, 2019.
Anonymous: Pilot's Operating Handbook: Cessna 1978—Skyhawk Cessna Model 172N, Jan. 1, 1977 (Jan. 1, 1977), XP055313879, Wichita, Kansas USA, Retrieved from the Internet: URL:https://www.flyingd.net/documents/N739EF_172N_POH_000.pdf [retrieved on Oct. 25, 2016] * Section 7, "Seats" and "Entrance Doors and Cabin Windows" *.
Anonymous: "Sky Shuttle—Helicopter service between Macau and Hong Kong or Shenzhen," Wodani—Helicopters, Transportation, Jul. 13, 2009 (Jul. 13, 2009), XP002778626, Retrieved from the Internet: URL:https://wodani.wordpress.com/2009/07/13/sky-shuttle-helicopter-service-between-macau-and-hong-kong-or-macau-and-shenzhen/ [retrieved on Feb. 27, 2018] *Agusta Westlandand AW139 Cabin Seating Plan*.
EPO Examination Report issued in EP Application Serial No. 17185780.8 dated Apr. 3, 2018, 6 pages.
EPO Examination Report issued in EP Application Serial No. 17185783.2 dated Mar. 27, 2018, 7 pages.
EPO Search Report issued in EP Application Serial No. 17185779.0 dated Mar. 19, 2018, 4 pages.
EPO Search Report issued in EP Application Serial No. 17185780.8 dated Mar. 14, 2018, 6 pages.
EPO Search Report issued in EP Application Serial No. 17185783.2 dated Mar. 12, 2018, 5 pages.
EPO Examination Report issued in EP Application Serial No. 17185780.8 dated Sep. 28, 2018, 5 pages.
EPO Examination Report issued in EP Application 18184588.4 dated Mar. 8, 2019, 6 pages.
EPO Search Report issued in EP Application 18184588.4 dated Feb. 21, 2019, 4 pages.
EPO Examination Report issued in EP Application Serial No. 17185779.0 dated Jun. 15, 2018, 7 pages.
EPO Search Report issued in EP Application Serial No. 17185783.2 dated Sep. 12, 2018, 7 pages.
N.N.N.N.: "Cutaway ML MI-8" In: "Cutaway MIL MI-8," Feb. 23, 2014 (Feb. 23, 2014),http://3.bp.blogspot.com/-MZJpilssI6s/UFLTtzrG0ml/AAAAAAAAEr0/BIYZxL2Ulow/s1600/Mi-8TB-Cutaway-Untitled-1_003.jpg, XP055504429, pp. 1-1.
AirTeamImages.com, "Agusta Westland AW-189," Feb. 13, 2012, https://www.airteamimages.com/agustawestland-aw-189__agustawestland_143375.html; 4 pages.
USPTO Non-Final Office Action for U.S. Appl. No. 15/405,284 dated Jun. 24, 2019.
EPO Examination Report issued in EP Application Serial No. 17185779.0 dated Feb. 13, 2019, 5 pages.
USPTO Non-Final Office Action for U.S. Appl. No. 15/405,246 dated Jun. 13, 2019.
EPO Examination Report issued in EP Application Serial No. 17185780.8 dated Apr. 26, 2019, 5 pages.

* cited by examiner

PUCK COVER

TECHNICAL FIELD

This disclosure relates generally to aircraft mounts, and more particularly, though not exclusively, to a puck cover.

BACKGROUND

There are many different types of aircraft available for a variety of different purposes. The various types of aircraft may require a variety of different fixtures and associated configurations, such as seating and furniture fixtures in the aircraft interiors. The configuration of aircraft fixtures may vary greatly based on various factors, including the type of aircraft, the purpose of the aircraft, and any other needs or requirements of an aircraft operator (such as business and/or legal related requirements), among other examples.

SUMMARY

According to one aspect of the present disclosure a puck cover can be removably coupled to a puck of a rotorcraft. The puck cover can include a top cover surface, a center support, and a plurality of extensions. The top cover can be a solid surface and/or textured and have a curved or square shaped profile. In addition, a seal can be around the top cover surface to help keep liquids and/or foreign object debris (FOD) out of the puck. Further, grippers can be under the top cover surface to help keep the puck cover from sliding or moving on a carpeted or other similar surface.

The puck can be configured to be embedded in a structure of the rotorcraft and the puck can include an attachment post for coupling a removable fixture to the structure in which the puck is embedded. The structure of the rotorcraft is a floor panel of the rotorcraft. The puck creates a cavity in the structure when the fixture is not coupled to the attachment post and the puck cover can cover the cavity in the structure when the fixture is not coupled to the attachment post. In an example, the plurality of extensions of the puck cover can couple with the attachment post. In addition, the center support can be over the attachment post.

Figure 1A:
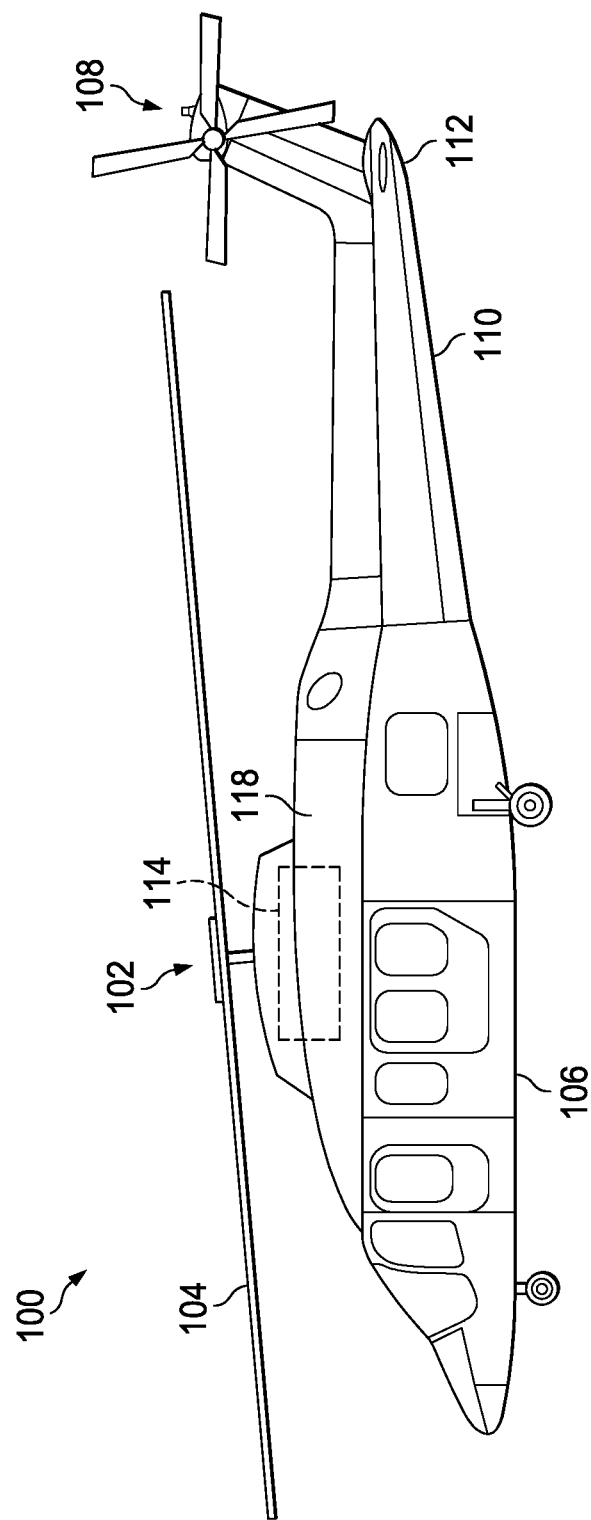
FIGS. 1A and 1B illustrate an example aircraft in accordance with certain embodiments.

The FIGURES of the drawings are not necessarily drawn to scale, as their dimensions can be varied considerably without departing from the scope of the present disclosure.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed. In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Example embodiments that may be used to implement the features and functionality of this disclosure will now be described with more particular reference to the attached FIGURES.

Figure 1B:
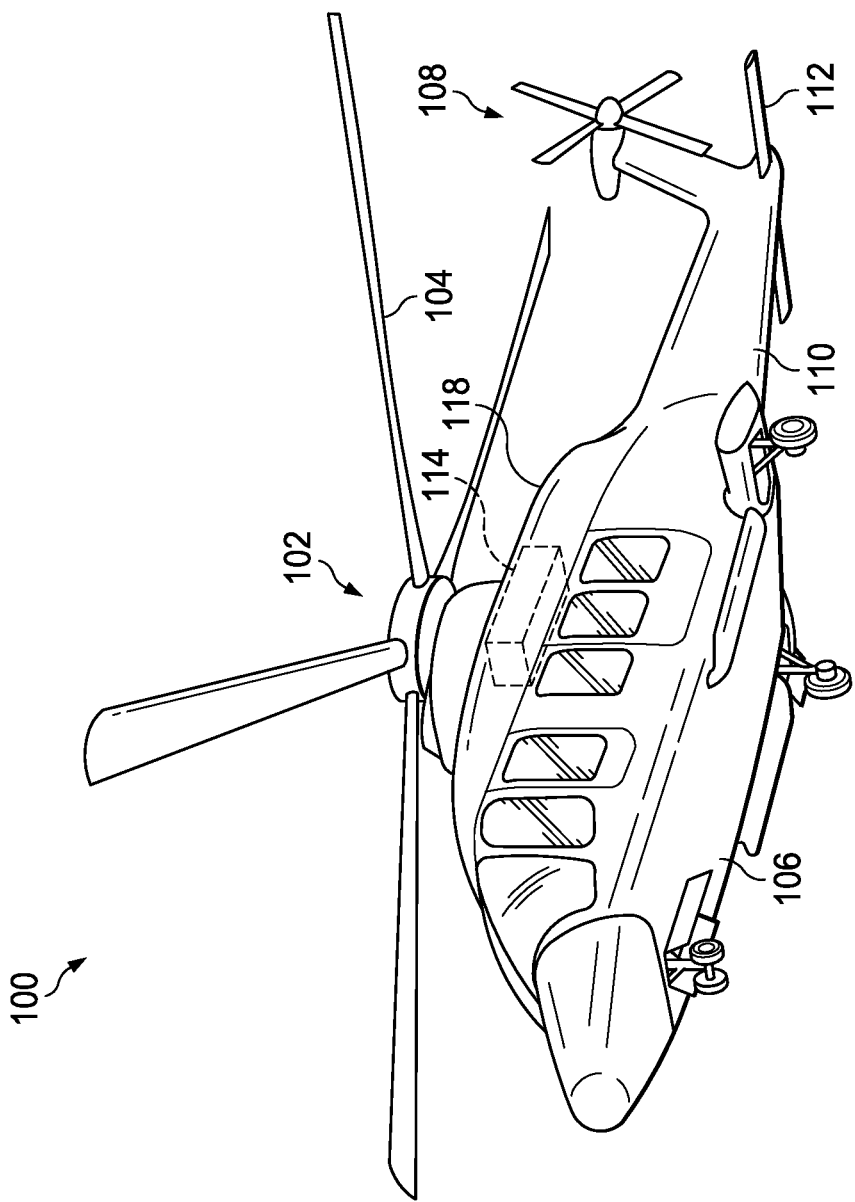

FIGS. 1A and 1B illustrate an example embodiment of a rotorcraft 100. FIG. 1A illustrates a side view of rotorcraft 100, while FIG. 1B illustrates a perspective view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine 114. Airframe 118 includes the outer covering of rotorcraft 100

Figure 2:
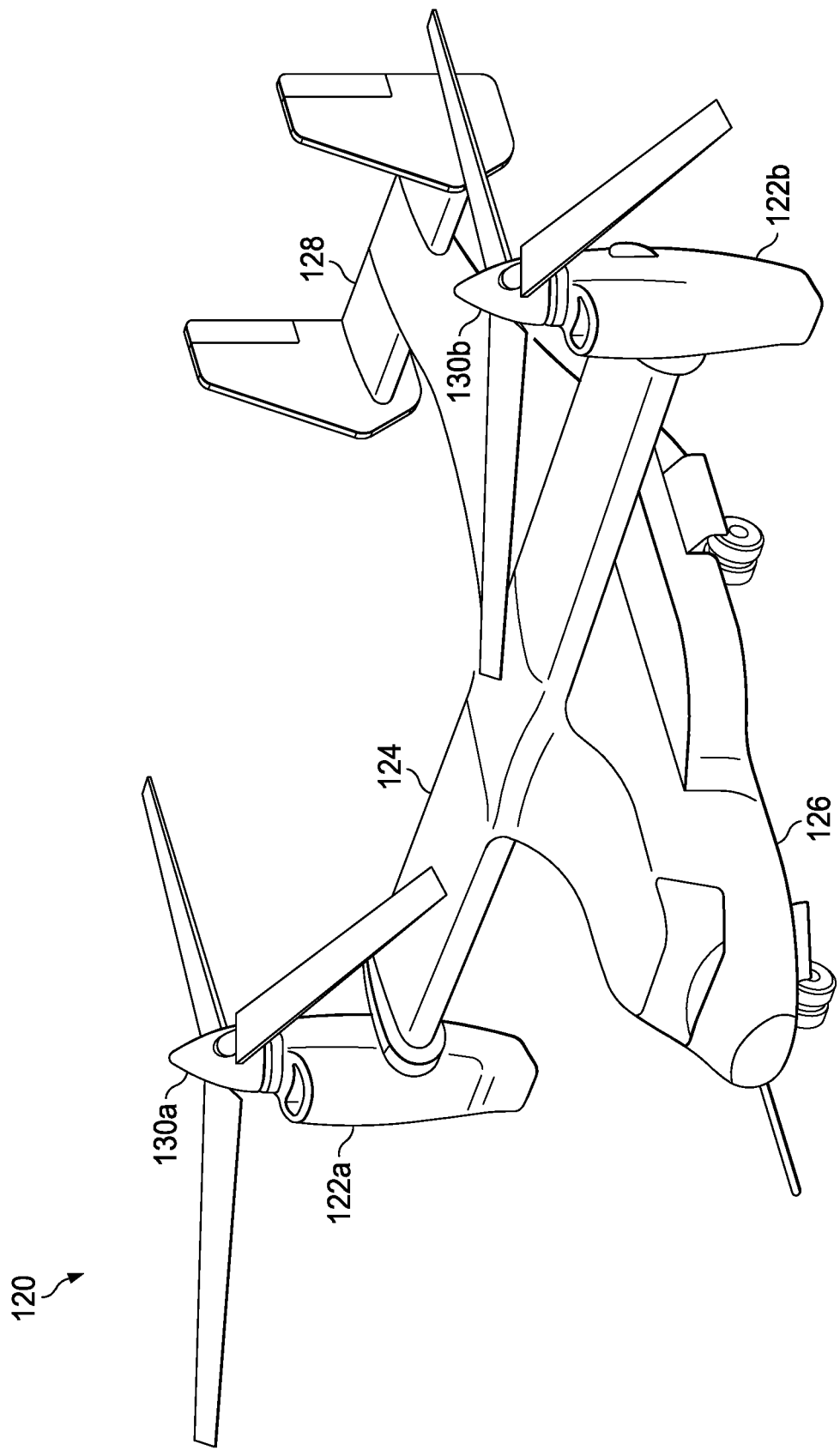
FIG. 2 illustrates an example aircraft in accordance with certain embodiments.

FIG. 2 illustrates a perspective view of an example tiltrotor aircraft 120. Tiltrotor aircraft 120 can include nacelles 122a and 122b, a wing 124, a fuselage 126, and a tail member 128. Each nacelle 122a and 122b can include an engine and gearbox for driving rotor systems 130a and 130b, respectively. Nacelles 122a and 122b are each configured to rotate between a helicopter mode, in which the nacelles 122a and 122b are approximately vertical, and an airplane mode, in which the nacelles 122a and 122b are approximately horizontal.

It should be appreciated that rotorcraft 100 of FIGS. 1A and 1B and tiltrotor aircraft 120 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

There are many different types of aircraft available for a variety of different purposes. The various types of aircraft may require a variety of different fixtures and associated configurations, such as seating and furniture fixtures in the aircraft interiors. The configuration of aircraft fixtures may vary greatly based on various factors, including the type of aircraft, the purpose of the aircraft, and any other needs or requirements of an aircraft operator (such as business and/or regulatory related requirements), among other examples. Fixed wing airplanes, rotorcrafts (e.g., helicopters), tiltrotor aircraft, and other aircraft may be used for commercial and/or private travel, cargo transportation, military purposes, and oil and gas exploration, among other examples.

The interior configurations of these aircraft (e.g., seating and furniture configurations) typically vary based on the type and purpose of each aircraft. For example, the number, size, and arrangement of seats in an aircraft may vary. Aircraft used for commercial travel (e.g., airplanes), for example, may require more seats than aircraft used for private travel, corporate travel, or oil and gas exploration, among other examples. Moreover, aircraft used for corporate or private travel may require custom configurations of seats and/or other interior fixtures, such as tables, cabinets, storage compartments, desks, office equipment and furniture, entertainment equipment and furniture, and beds, among other examples. Certain types and/or uses of aircraft may also be subject to business and/or legal constraints that impact the interior configuration required for the aircraft, such as government safety regulations. For example, certain aircraft may be subject to government regulations relating to seating configuration, emergency exits, and cargo or luggage storage, such as regulations issued by the Federal Aviation Administration (FAA). Transport rotorcraft (e.g., helicopters), for example, may be subject to FAA regulations associated with the number of seats, seat and aisle spacing, access to emergency exits, and so forth (e.g., as set forth by various regulations from 14 C.F.R. § 29). As another example, rotorcraft used for oil and gas exploration may be subject to OGP operator standards (e.g., enhanced safety standards) for operations pursued under the International Association of Oil and Gas Producers (the IOGP or OGP).

Figure 3A:
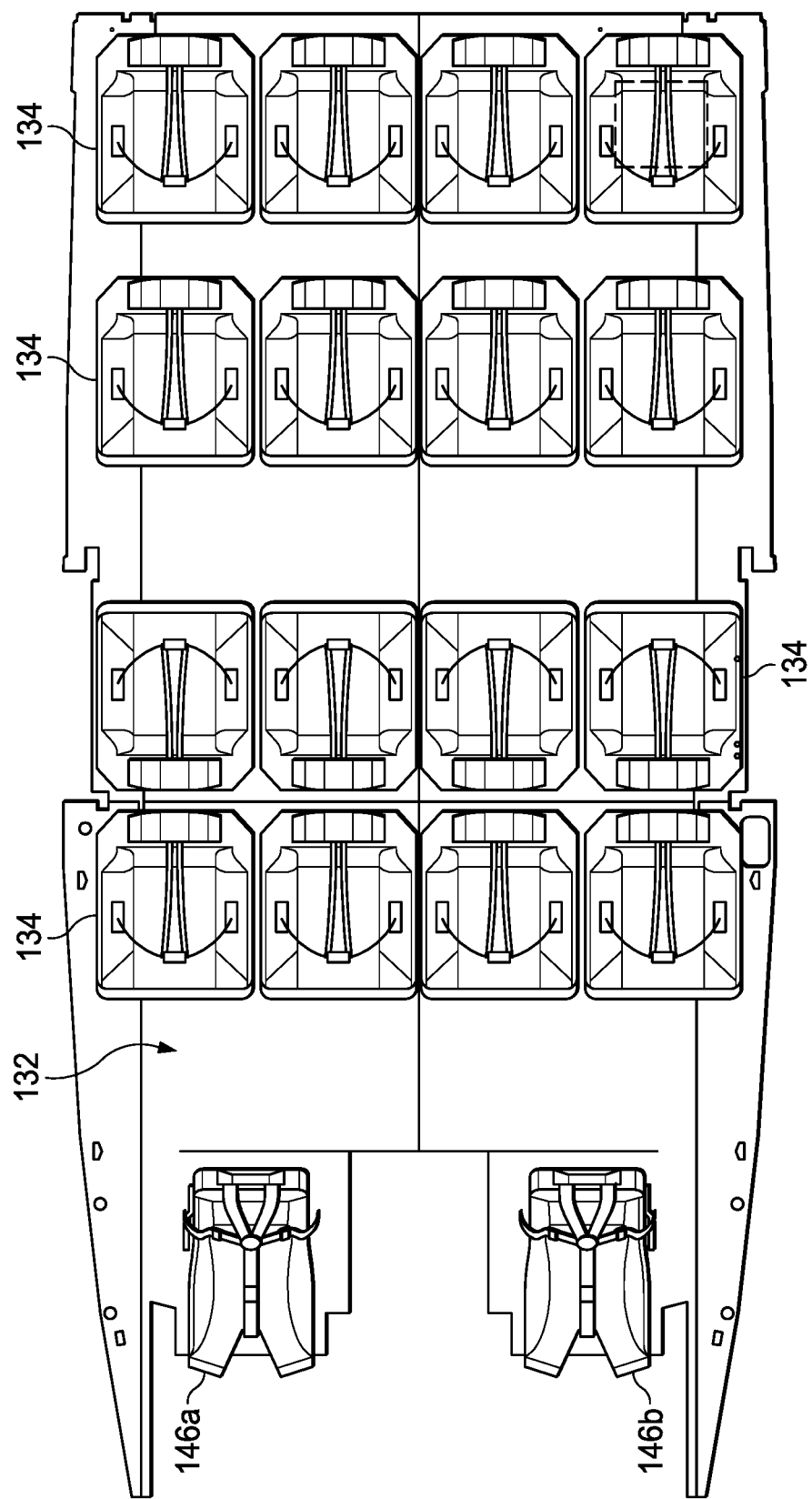
FIGS. 3A-3C illustrate example rotorcraft seating configurations in accordance with certain embodiments.

FIG. 3A illustrates an example seating arrangement for 16 passengers. In the example, a floor 132 of a rotorcraft is shown and an arrangement of 16 seats 134 and pilot seats 146a and 146b are installed in rotorcraft floor 132. In an example, pilot seat 146a may be the captain or pilot's seat while pilot seat 146b may be a co-pilot seat. There are four rows of seats 134 throughout the floor 132 of the rotorcraft, and each row includes four adjacent seats 134. The seats in the $1^{st}$, $3^{rd}$, and $4^{th}$ rows all face towards the front of the rotorcraft, while the seats in the $2^{nd}$ row face towards the back of the rotorcraft. In this manner, the seats in the $2^{nd}$ and $3^{rd}$ rows (e.g., the two middle rows) face each other.

Figure 3B:
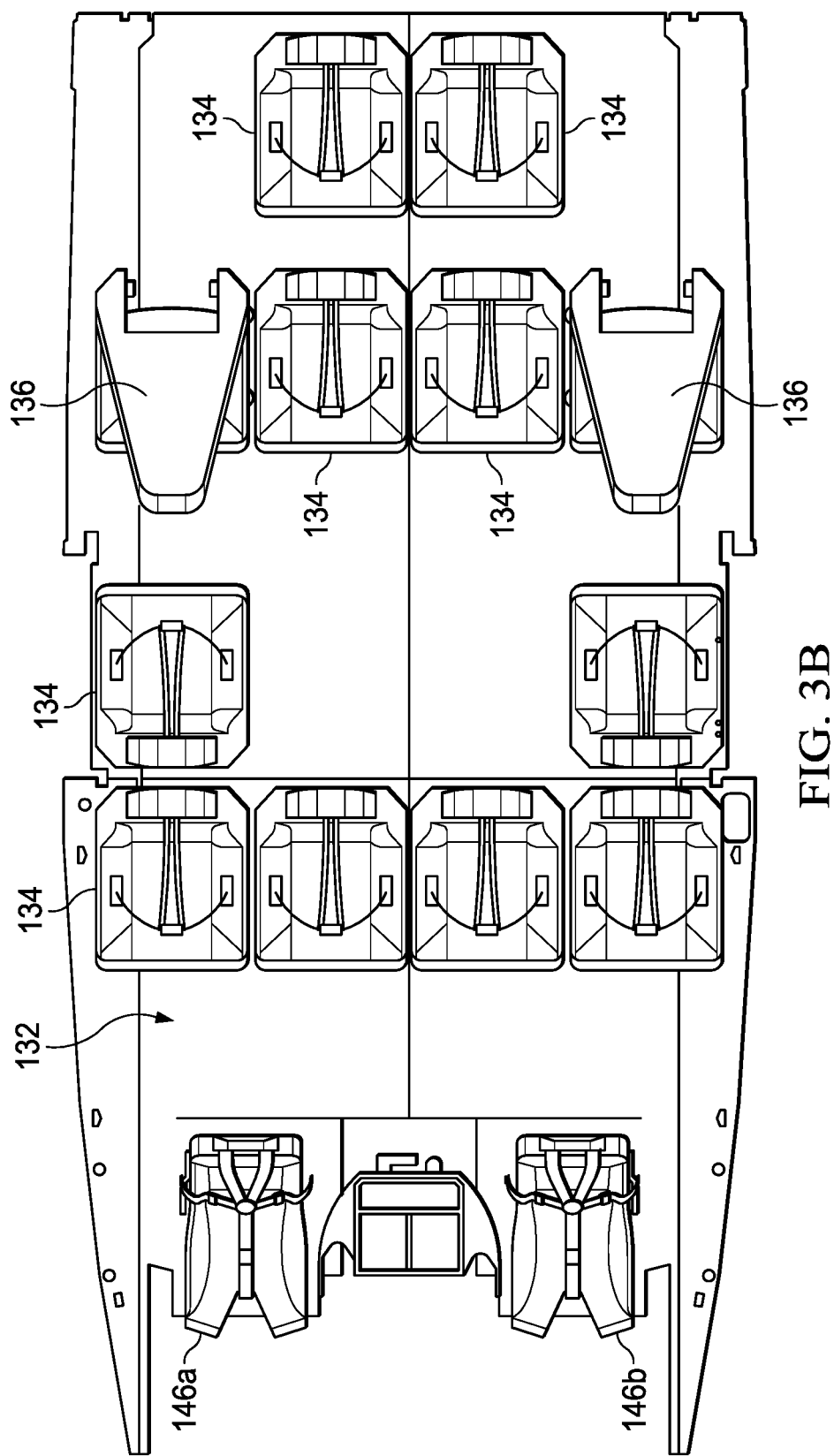

FIG. 3B illustrates a passenger seating arrangement with fold over seats 136. The illustrated seating arrangement of FIG. 3B is similar to the 16-passenger seating arrangement of FIG. 3A, except with four fewer seats 134 and the seating arrangement of FIG. 3B includes fold over seats 136 on the left and right ends of the $3^{rd}$ row. The seats in the $1^{st}$, $3^{rd}$, and $4^{th}$ rows all face towards the front of the rotorcraft, while the seats in the $2^{nd}$ row face towards the back of the rotorcraft. In this manner, the seats in the $2^{nd}$ and $3^{rd}$ rows (e.g., the two middle rows) face each other. Moreover, the two seats on the left and right ends of the $3^{rd}$ row are fold over seats 136, which may facilitate emergency exit access and egress for certain passengers.

Figure 3C:
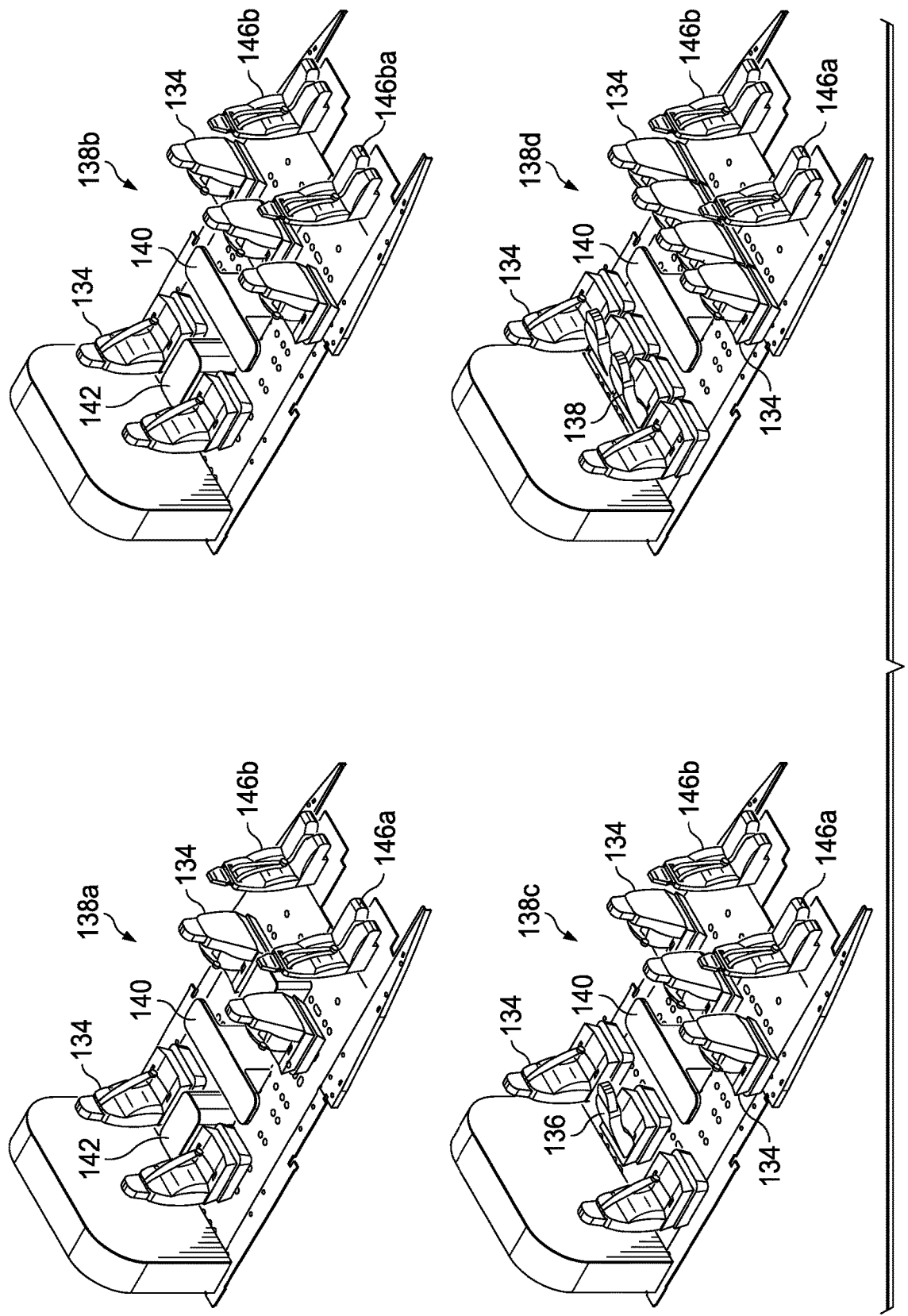

FIG. 3C illustrates a three-dimensional perspective of various corporate fixture (e.g., seats, furniture, compartments, and/or other fixtures) configurations 138a-d. For example, configuration 138a is a 4-passenger seating configuration. As shown in the illustrated example, there are two rows of seats 134 with two seats 134 per row, a center table 140 between the rows of seats 134, and a side table 142 between seats 134 in at least one row. A storage compartment (or other desired fixture) can be located at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Configuration 138b is a 5-passenger seating configuration. As shown, there are two rows of seats 134, with three seats in the $1^{st}$ row and two seats in the $2^{nd}$ row, center table 140 is between the seat rows, and side table 142 is between two seats 134. A storage compartment (or other desired fixture) can be located at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Configuration 138c is a 6-passenger seating configuration. As shown in the illustrated example, there are two rows of seats 134, with three seats per row and a center table 140 between the seat rows. Moreover, the center seat of the $2^{nd}$ row is a fold over seat (e.g., fold over seat 136), which may facilitate access to a storage compartment (or other desired fixture) at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other.

Configuration 138d is an 8-passenger seating configuration. As shown, there are two rows of seats 134, with four seats per row and a center table 140 between the seat rows. A storage compartment (or other desired fixture) can be located at the back of the rotorcraft. The two middle seats of the $2^{nd}$ row are fold over seats (e.g., fold over seat 136), which may facilitate access to the storage compartment at the back of the rotorcraft. The seats in the $1^{st}$ row face towards the back of the rotorcraft, while the seats in the $2^{nd}$ row face towards the front of the rotorcraft. In this manner, the seats in the $1^{st}$ and $2^{nd}$ rows face each other. Almost any desired fixture(s) can be installed at the back of the rotorcraft (e.g., a storage or baggage compartment, cabinetry, beverage center, ice bins, and so forth) depending on user preference. Seats 134, fold over seats 136, center table 140, side table 142, and other furniture, storage, fixture, etc. can be attached to rotorcraft floor 132 using one or more pucks and other seat attachment mechanisms.

Figure 4:
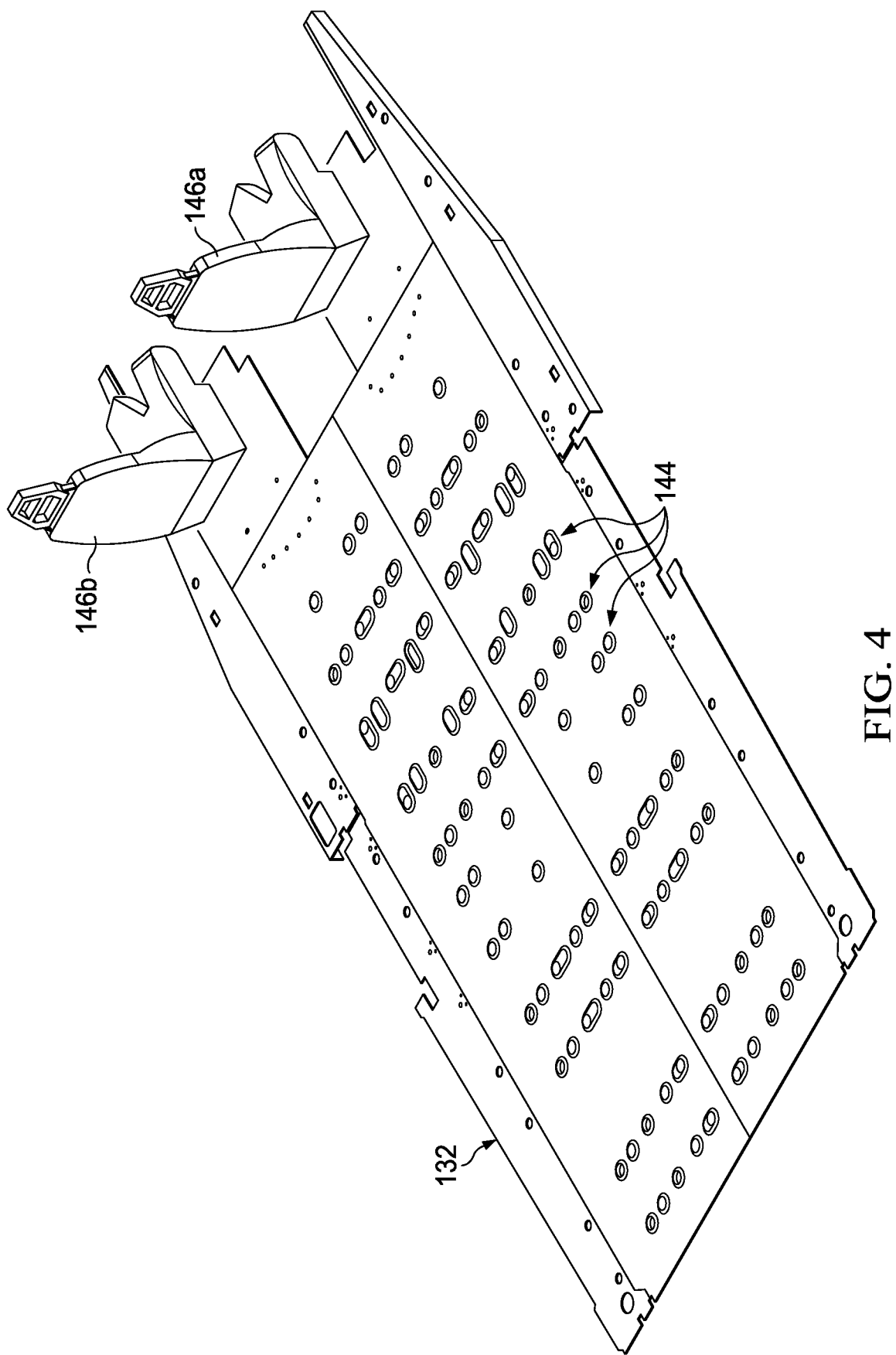
FIG. 4 illustrates an example puck configuration in accordance with certain embodiments.

FIG. 4 illustrates example configurations of pucks 144 in the floor 132 of a rotorcraft. In the illustrated example, pilot seats 146a and 146b are attached to rotorcraft floor 132. Moreover, rotorcraft floor 132 includes an arrangement of pucks 144 that can have different shapes, sizes, numbers of attachment points, and spacing between each puck 144. Accordingly, the fixtures (e.g., seats, furniture, compartments, and/or other fixtures) of the rotorcraft are configurable using the pucks 144 installed in the rotorcraft floor 132. The particular configuration and design of pucks 144 used in the illustrated example is for illustration purposes only. Thus, in some cases, a rotorcraft may use a single floor panel that supports multiple seating arrangements. In some cases, the particular approach may depend on the needs and/or requirements of an operator of the rotorcraft.

Figure 5:
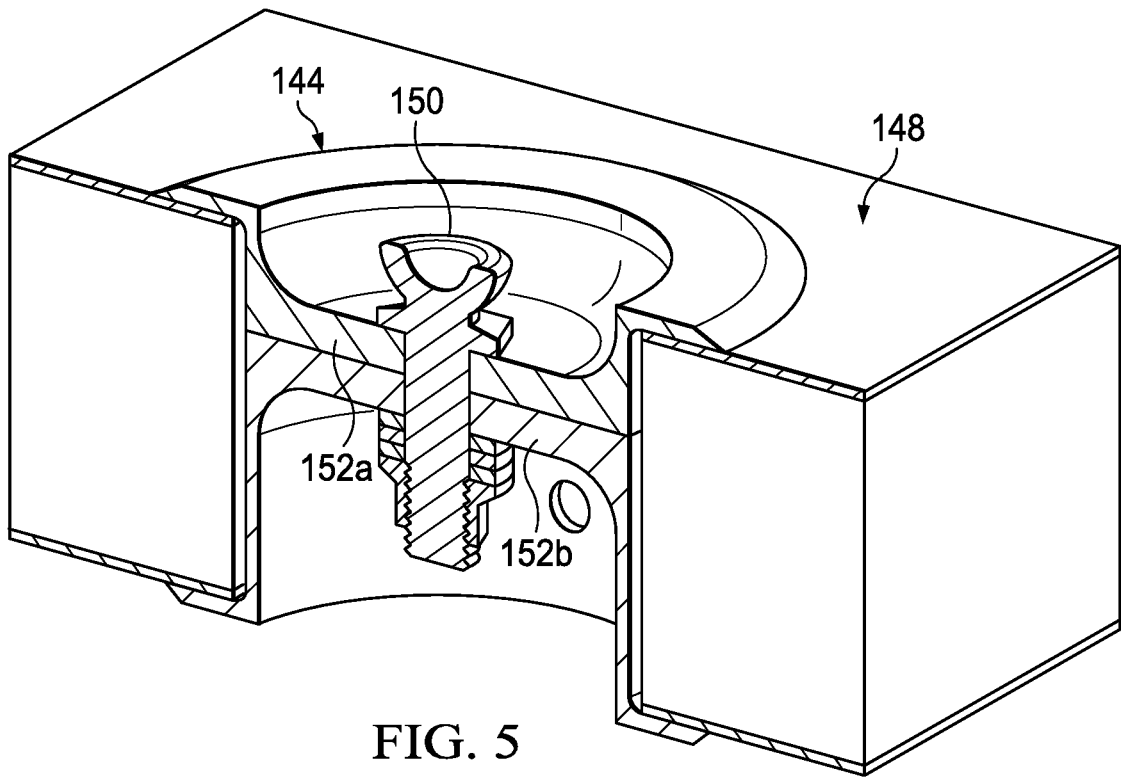
FIG. 5 illustrates an example puck in accordance with certain embodiments.

FIG. 5 illustrates an example embodiment of a puck 144. In the illustrated embodiment, puck 144 is installed in surface 148. In some embodiments, for example, surface 148 may be a surface or structure of an aircraft, such as the floor panel of a rotorcraft or a wall. In some embodiments, surface 148 may comprise a composite core, such as a honeycomb or foam core. In other embodiments, however, any suitable type of surface 148 may be used.

In the illustrated embodiment, puck 144 includes an attachment point 150. Attachment point 150, for example, may be used as an attachment point for fixtures (e.g., seats, furniture, compartments, and/or other fixtures attached to surface 148 in which puck 144 is embedded). A fixture can include a corresponding attachment point or fitting that can be mechanically clamped down on attachment point 150 of puck 144. Thus, the fixture may be installed by clamping down its attachment point(s) to the attachment point(s) 150 of one or more pucks 144. In some embodiments, attachment point 150 of puck 144 may include a stud fastened to puck 144 using mechanical fasteners (e.g., a locking nut and washers), and the stud of puck 144 may interface with a corresponding attachment point of a particular fixture. Moreover, in some embodiments, puck 144 may include multiple attachment points 150.

In the illustrated embodiment, puck 144 also includes flanges 152a and 152b. In some embodiments, puck 144 may be formed from two adjacent and internal flanges 152a and 152b. For example, puck 144 may be formed using two vertically arranged components that each include flanges 152a and 152b, with flanges 152a and 152b situated internally and adjacent to each other when puck 144 is embedded within a particular surface 148. Flanges 152a and 152b, for example, may each include an internal ridge or rim that provides structural support and strength when puck 144 is used as an attachment point for a fixture. For example, when a fixture is attached to puck 144, flanges 152a and 152b may provide a load path for transferring and/or shearing the load over a given area of surface 148 in which puck 144 is installed. In some cases, the two components with flanges 152a and 152b may be distinct or separable parts of puck 144.

In some embodiments, puck 144 may be installed in a particular surface 148 by first drilling a hole in surface 148, and then placing two flange components (e.g., flanges 152a and 152b) of the puck 144 in the hole, with the flanges arranged adjacently in the hole and with attachment point 150 in the center. In this manner, puck 144 can be mechanically clamped or installed in the drilled hole, thus avoiding the need to use an adhesive bond to hold puck 144 in place. In some embodiments, however, an adhesive bond may still be used or injected, for example, in order to seal any gaps (e.g., to prevent moisture). In this manner, pucks 144 can be installed in a particular surface 148 even after the surface has been fabricated or manufactured. For example, in some cases, blank floor panels for rotorcraft could be fabricated or manufactured, and then pucks 144 could be subsequently installed in the floor panels using the appropriate configuration (e.g., using a configuration desired by a particular rotorcraft operator).

Once installed, pucks 144 may be used to attach fixtures to the surface 148 in which they are installed (e.g., for attaching e.g., seats, furniture, compartments, and/or other fixtures). The fixtures may include attachment points, such as claw-based attachment fittings, which can be mechanically clamped down on the corresponding attachment points 150 of pucks 144. Thus, fixtures can be installed by clamping down their attachment points to the appropriate attachment points 150 of pucks 144. Fixtures can similarly be removed by disconnecting the fixture attachments points from the corresponding attachment points 150 of the pucks 144. In this manner, the configuration of fixtures (e.g., seating configurations) can be relatively easily modified, for example, by adding, removing, and/or rearranging certain fixtures, as desired. Thus, pucks 144 may enable fixtures to be configured in a more flexible manner than is possible using other attachment mechanisms, such as rail-based mechanisms, which may require all or many of the existing fixtures to be removed from the rails in order to add, remove, and/or rearrange certain fixtures on the rails (e.g., by sliding the existing fixtures off the rails, and then sliding fixtures back on the rails using a new fixture arrangement). Pucks 144 may also enable attachment points to be added to a particular surface 148 without compromising the flat nature of the surface, given that pucks 144 can be embedded within the surface 148 in which they are installed.

A puck may be a cylindrical or puck shaped mechanism that can be installed in a variety of locations in an aircraft and that provides attachment point(s) for fixtures. Pucks may be used to attach any type of fixture to an aircraft, including but not limited to, furniture (e.g., seats, tables, cabinets, storage compartments, desks, computer stands, beds), office or entertainment equipment, cargo storage mechanisms (e.g., for secure lock-down of baggage and cargo), and litter kits, among other examples. Moreover, pucks may be used to install fixtures in any location of an aircraft, including the main cabin, the baggage or cargo bay, the walls or roof, and even the aircraft exterior (e.g., for cargo nets, wing tie-downs, and other external features).

Pucks can be installed in an aircraft using a variety of configurations, and the particular configuration may depend on the type of aircraft, the purpose of the aircraft, the particular fixtures that will be installed in the aircraft, and any other needs or requirements of an aircraft operator (such as business and/or regulatory related requirements), among other examples. In some cases, pucks may be used to enable flexible seating and furniture configurations in aircraft interiors, including varying numbers of seats and various seating arrangements. For example, in some cases, rotorcraft may use pucks to provide seating configurations for a variable number of passengers, such as seating configurations ranging from 16 to 20 passengers. In addition, rotorcraft used for oil and gas exploration may use pucks to enable seating configurations that comply with FAA and OGP standards. In some cases, pucks may be used to install particular seating arrangements and/or foldover seats in an aircraft or rotorcraft, for example, to facilitate access to the exits in a manner that complies with OGP standards (and/or any other standards, requirements, or regulations). Moreover, rotorcraft used for corporate, private, and/or VIP travel may use pucks to enable various custom seating and furniture configurations (e.g., as desired by the operator and/or passengers).

Multiple discrete pucks can be installed in order to attach a fixture that would otherwise require installation of an entire rail-based attachment mechanism. Installation of multiple discrete pucks rather than a long rail-based mechanism may result in a lightweight and relatively cheaper solution than a rail-based attachment mechanism. Moreover, because pucks can be embedded within and/or flush with the surface in which they are installed, attachment points can be added to a surface without compromising the flat nature of the surface. However, one issue with the use of pucks is that unused pucks create a hole or cavity in surface 148. The hole or cavity can create a hazard (e.g., tripping hazard), harbor foreign object debris (FOD), or create, cause, or otherwise help facilitate other issues.

A possible solution is to use a puck cover. In an example, unused pucks can be covered or plugged with a puck cover or plug. The puck cover can be relatively flush with the surface in which the puck is embedded, thus enabling flexible puck-based configurations to be installed in a surface while preserving a relatively flat nature for the surface. The puck cover can be relatively easily removed to allow for the reconfiguration of fixtures. Unused pucks 144 can be covered with the puck cover to help eliminate or reduce the puck causing a hazard (e.g., tripping hazard), harboring foreign object debris (FOD), or creating, causing, or otherwise helping facilitate other issues and to preserve the relatively flat nature of surface 148 in which the pucks are embedded, while also preserving the ability to subsequently reconfigure an arrangement of fixtures using the previously unused pucks.

It is to be understood that other embodiments may be utilized and structural changes may be made without departing from the scope of the present disclosure. Substantial flexibility is provided by rotorcraft 100 and tiltrotor aircraft 120 in that any suitable arrangements and configuration may be provided without departing from the teachings of the present disclosure.

Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Figure 6:
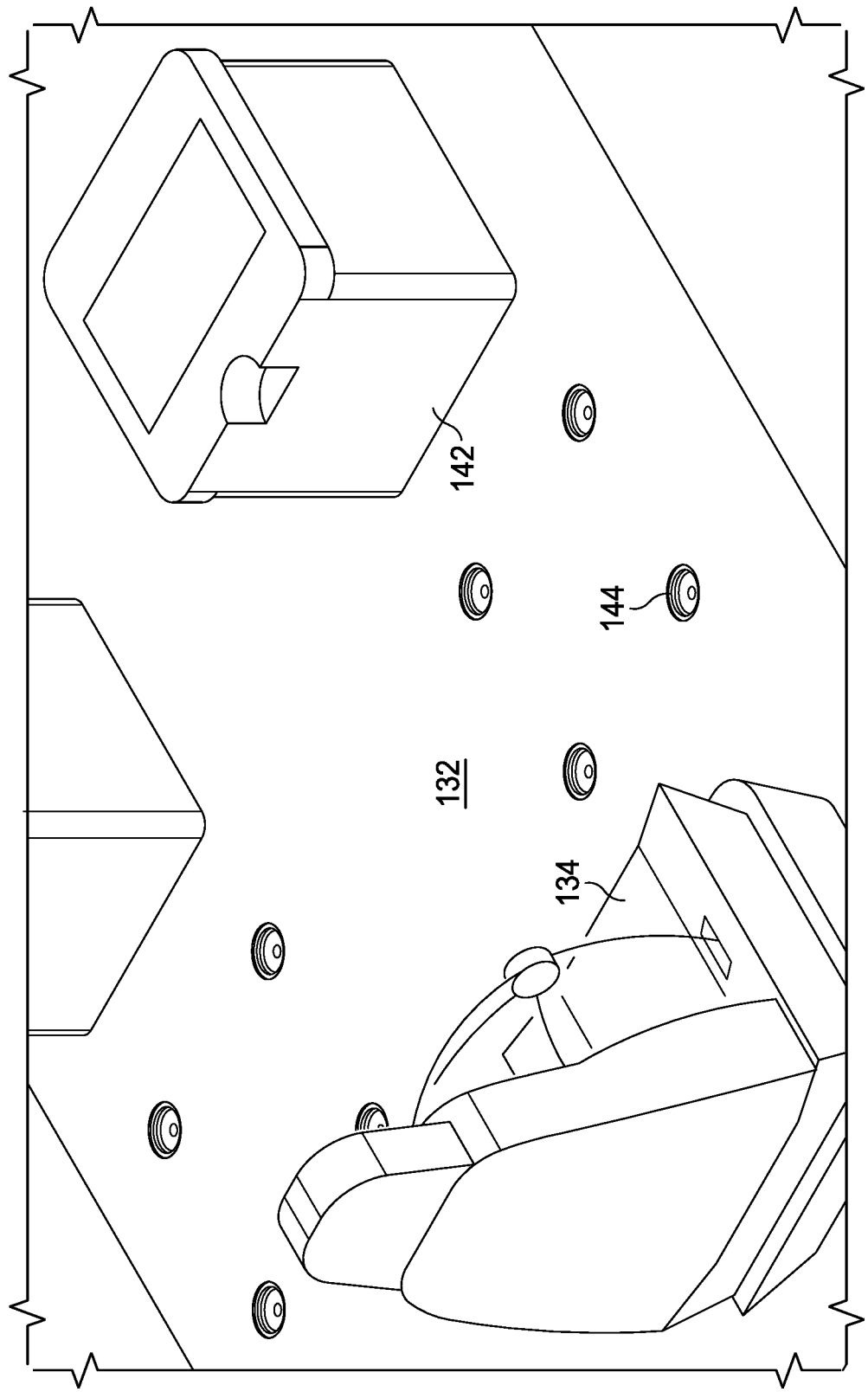
FIG. 6 illustrates an example puck configuration in accordance with certain embodiments.

Turning to FIG. 6, FIG. 6 illustrates a seat 134 and side table 142 secured to floor 132 using one or more pucks 144. As illustrated, unused pucks 144 on floor 132 create holes in floor 132. The unused pucks 144 can create a hazard (e.g., tripping hazard), harbor foreign object debris (FOD), or create, cause, or otherwise help facilitate other issues.

Figure 7:
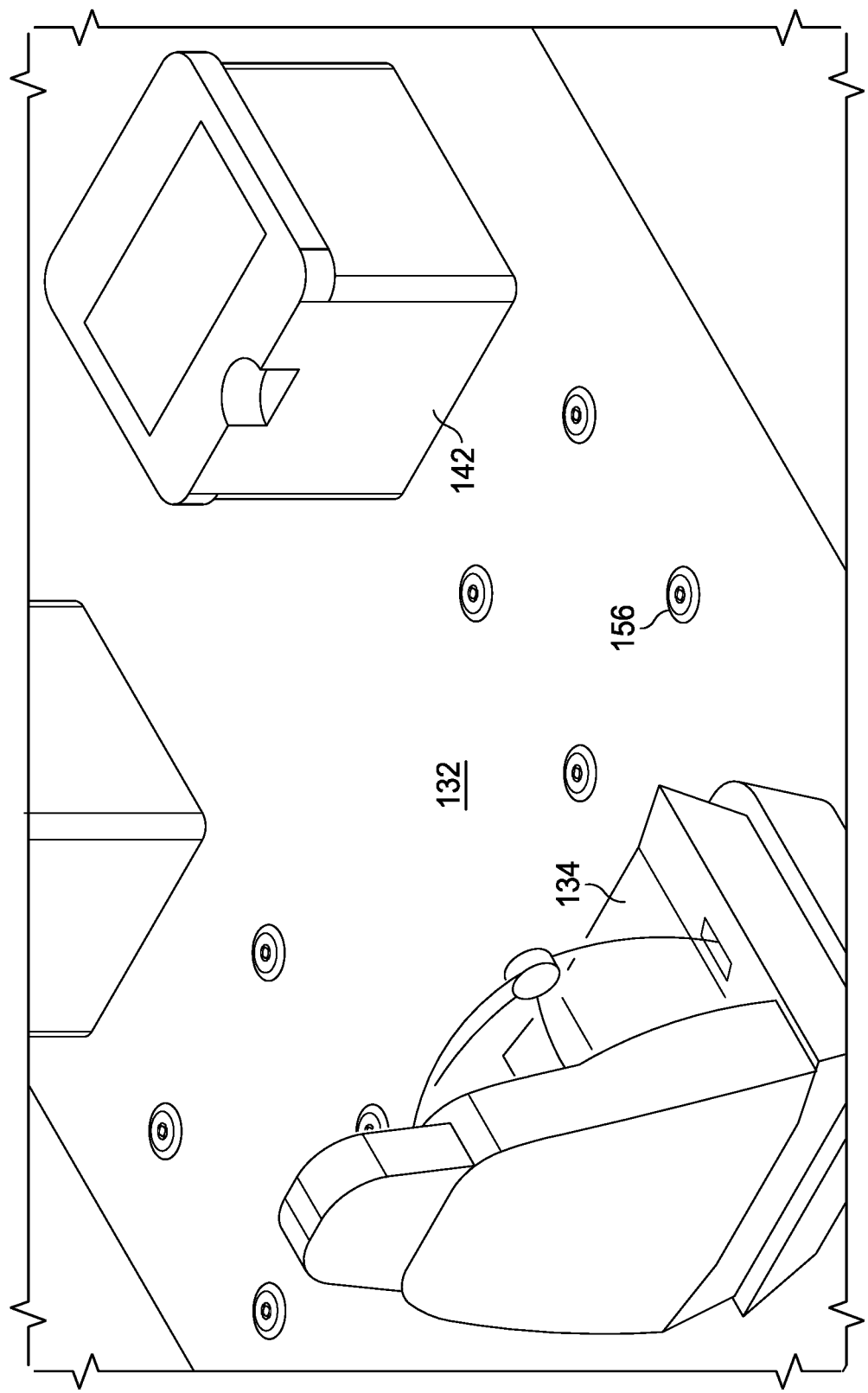
FIG. 7 illustrates an example puck cover in accordance with certain embodiments.

Turning to FIG. 7, FIG. 7 illustrates each unused puck 144 (not shown) being covered by a puck cover 156. Puck cover 156 can be configured to snap or otherwise coupled with puck 144 and mitigate against tripping and FOD, and can withstand occupant loads when directly stepped on by transferring weight to attachment point 150 and flanges 152 (not shown). In addition, puck cover 156 can be relatively flat or have a slightly curved profile to help preserve the relatively flat nature of floor 132.

Figure 8:
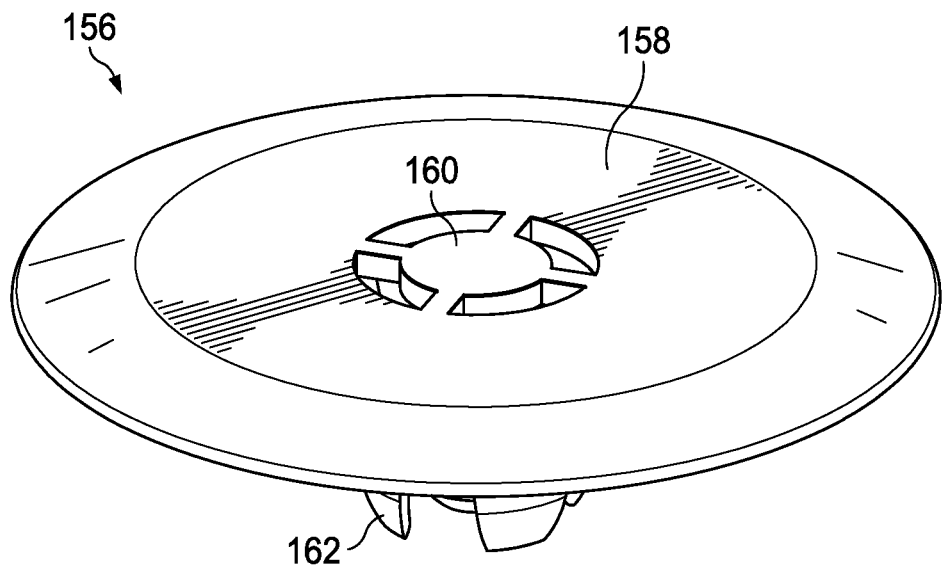
FIG. 8 illustrates an example puck cover in accordance with certain embodiments.

Turning to FIG. 8, FIG. 8 illustrates example details of puck cover 156. Puck cover 156 can include a top cover surface 158, a center support 160, and extensions 162. Top cover surface 158 can be relatively flat or have a slight curve to help preserve the relatively flat nature of surface 148. Center support 160 can help puck cover 156 withstand occupant loads when directly stepped on. In addition, each top cover surface 158 may have a textured surface to help prevent slipping and/or for aesthetic purposes.

Figure 9:
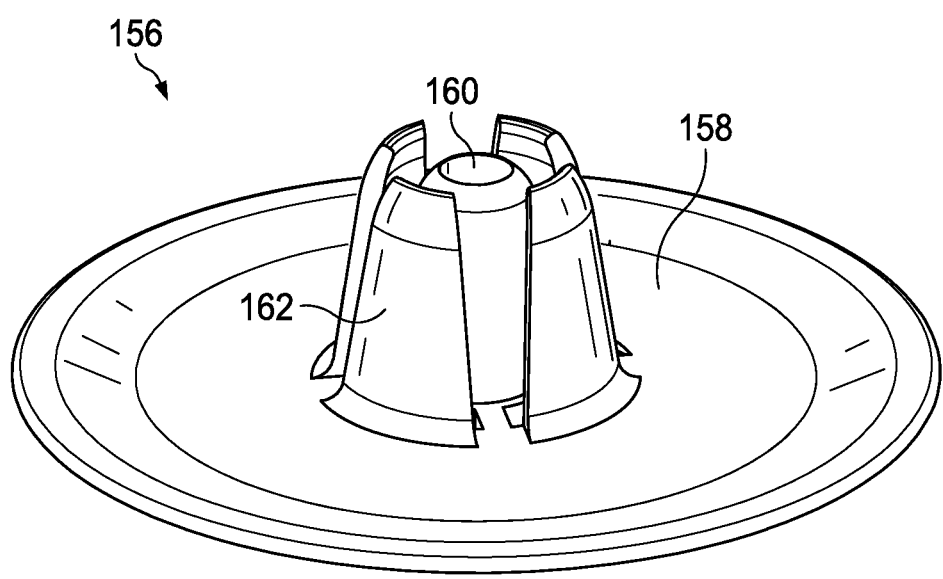
FIG. 9 illustrates an example puck cover in accordance with certain embodiments.

Turning to FIG. 9, FIG. 9 illustrates example details of puck cover 156. In an example, center support 160 can be configured be located on top of or over attachment point 150 (illustrated in FIG. 5). In addition, extension 162 can be configured to couple with the edges of attachment point 150 to help removably secure puck cover 156 to attachment point 150. Extension 162 can include claw-based attachment fittings which can be mechanically clamped down on an attachment point 150 of puck 144. In some examples, extension 162 may be spring loaded or some other type of mechanism that allows puck cover 156 to be removable secured to attachment point 150.

Figure 10:
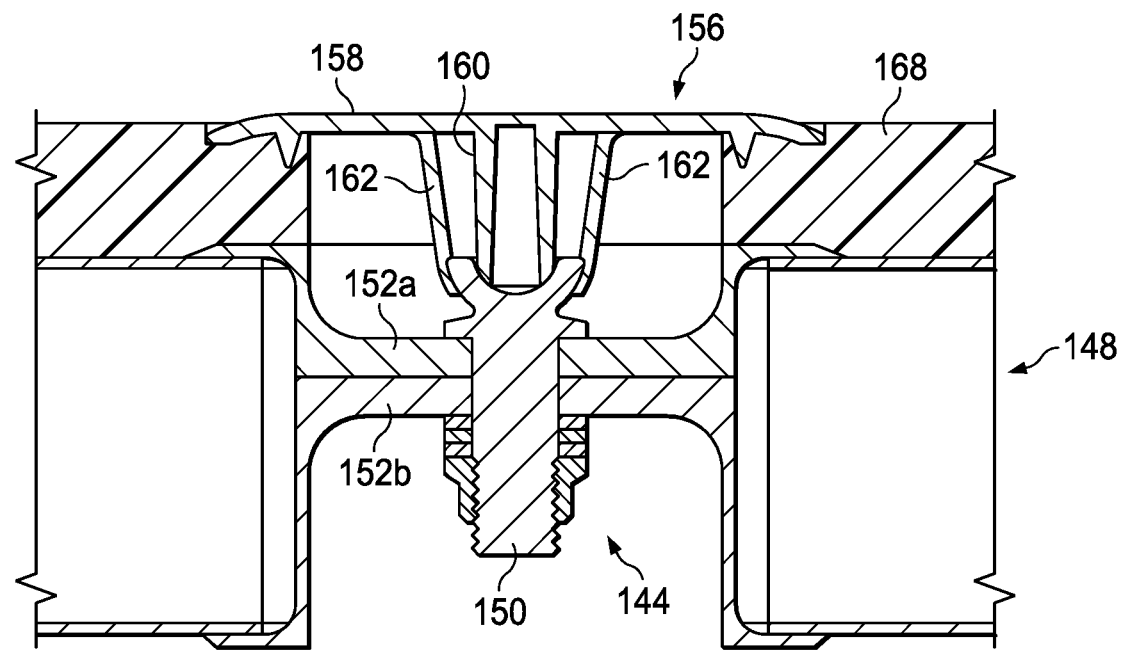
FIG. 10 illustrates an example puck cover in accordance with certain embodiments.

Turning to FIG. 10, FIG. 10 illustrates example details of puck 144 and puck cover 156. As illustrated in FIG. 10, a carpet 168 or some other layer may be over surface 148. Carpet 168 can include a hole or opening that allows access to puck 144. Puck cover 156 can be inserted into the hole or opening of carpet 168 such that extension 162 can couple with the edges of attachment point 150 to help secure puck cover 156 to attachment point 150. In addition, if surface 148 is a floor (e.g., floor 132), center support 160 can be on or over attachment point to help puck cover 156 withstand occupant loads when directly stepped on. For example, occupant loads on puck cover 156 can be at least partially transferred to attachment point 150, which at least partially transfers to the load to attachment point 150 and onto the structure of puck 144.

Figure 11A:
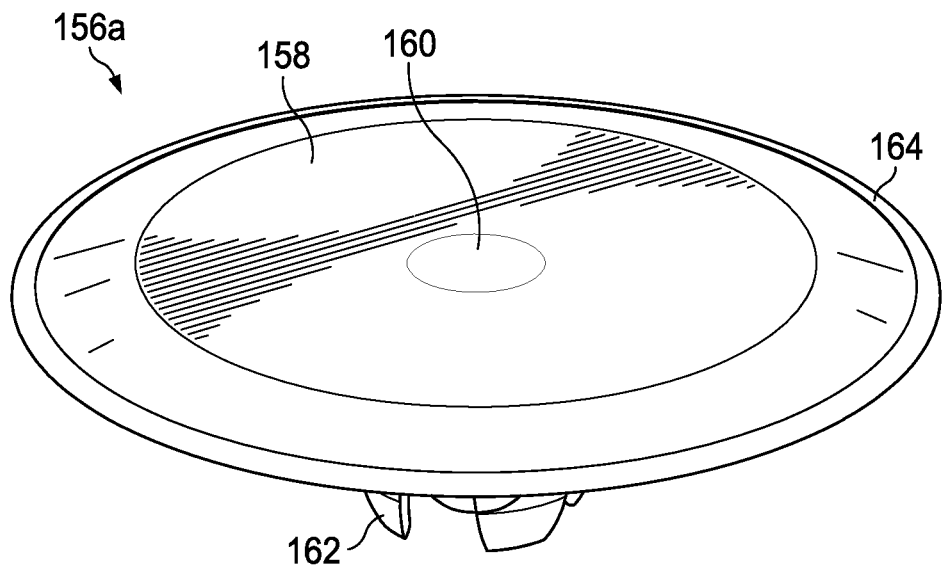
FIGS. 11A and 11B illustrate an example puck cover in accordance with certain embodiments.
Figure 11B:
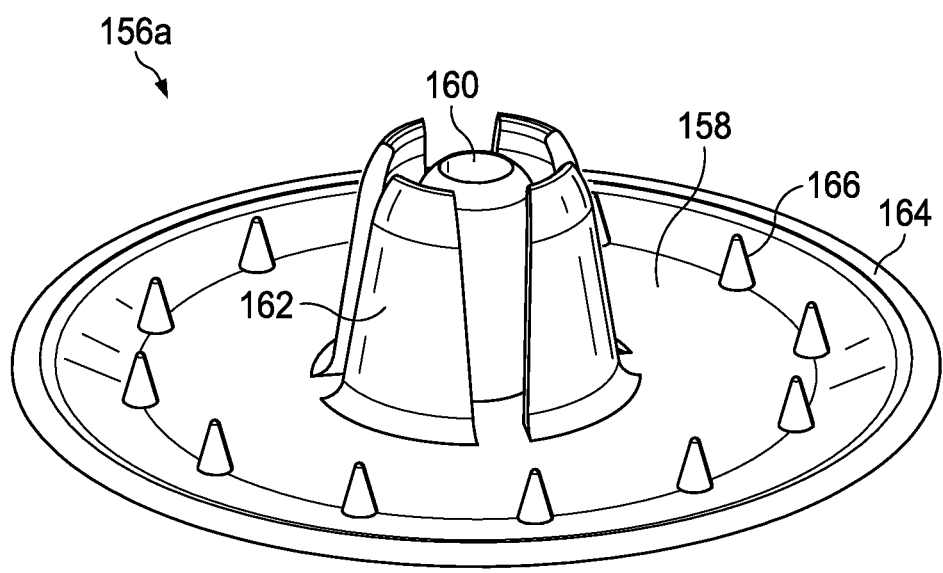

Turning to FIGS. 11A and 11B, FIGS. 11A and 11B illustrate example details of a puck cover 156a. Puck cover 156a can include a solid top cover surface 158, center support 160, and a seal 164. Seal 164 can surround top cover surface 158 and may be comprised of rubber or some other material that can help keep liquids and/or FOD out of puck 144. In an example, puck cover 156a can include a plurality of grippers 166. Grippers 166 can be configured to help keep puck cover 156a from sliding or moving on a carpeted or other similar surface where grippers can imbed in the surface and/or provide friction resistance to the movement of puck cover 156a relative to puck 144.

Figure 12A:
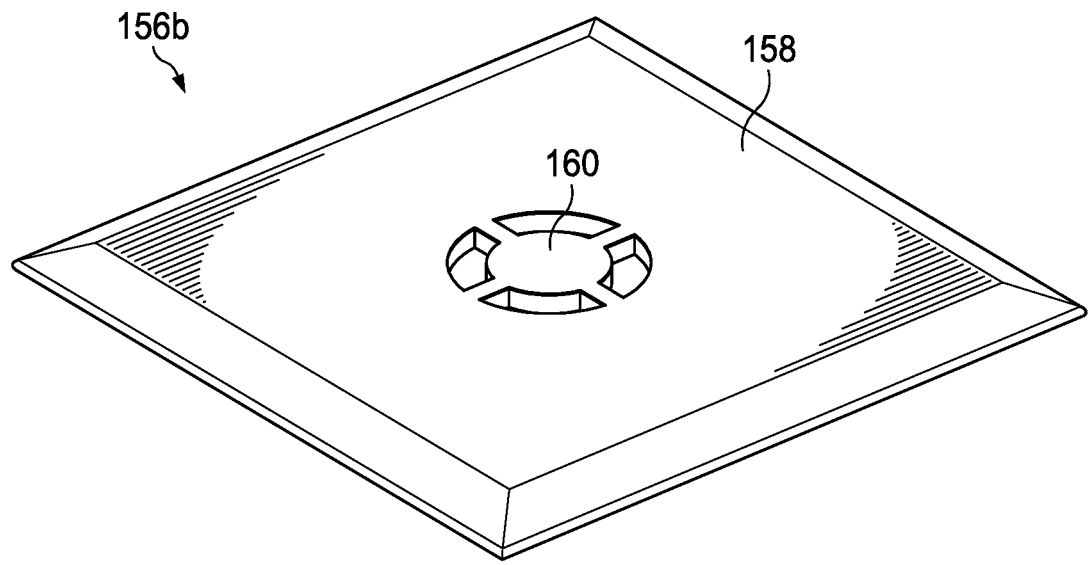
FIGS. 12A and 12B illustrate an example puck cover in accordance with certain embodiments. in accordance with certain embodiments.
Figure 12B:
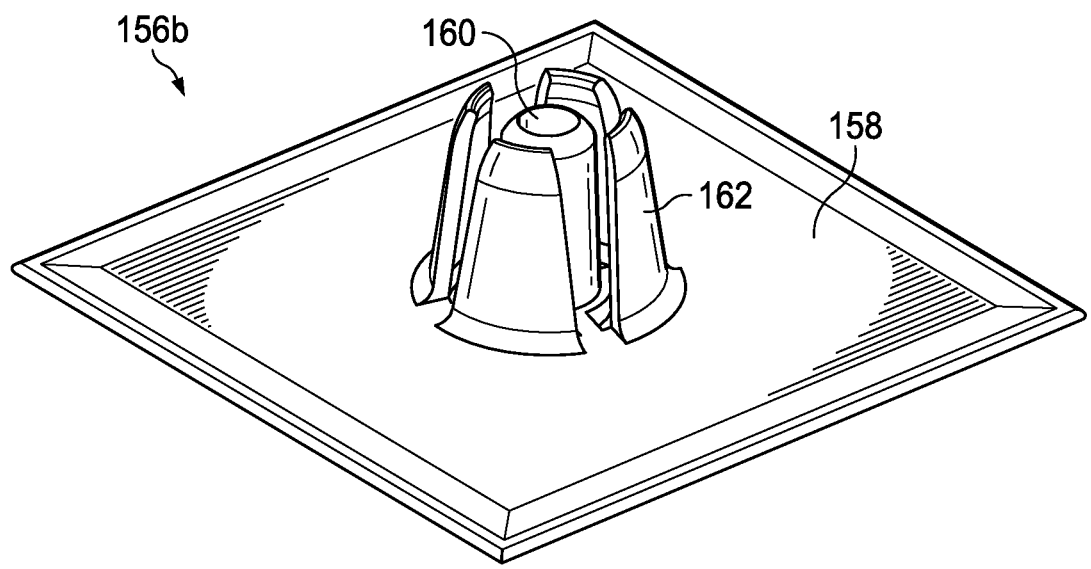

Turning to FIGS. 12A and 12B, FIGS. 12A and 12B illustrate example details of a puck cover 156b. Puck cover 156b can include top cover surface 158 and center support 160. As illustrated top cover surface 158 may have a square profile. The square profile may be for aesthetic purposes.

Figure 13A:
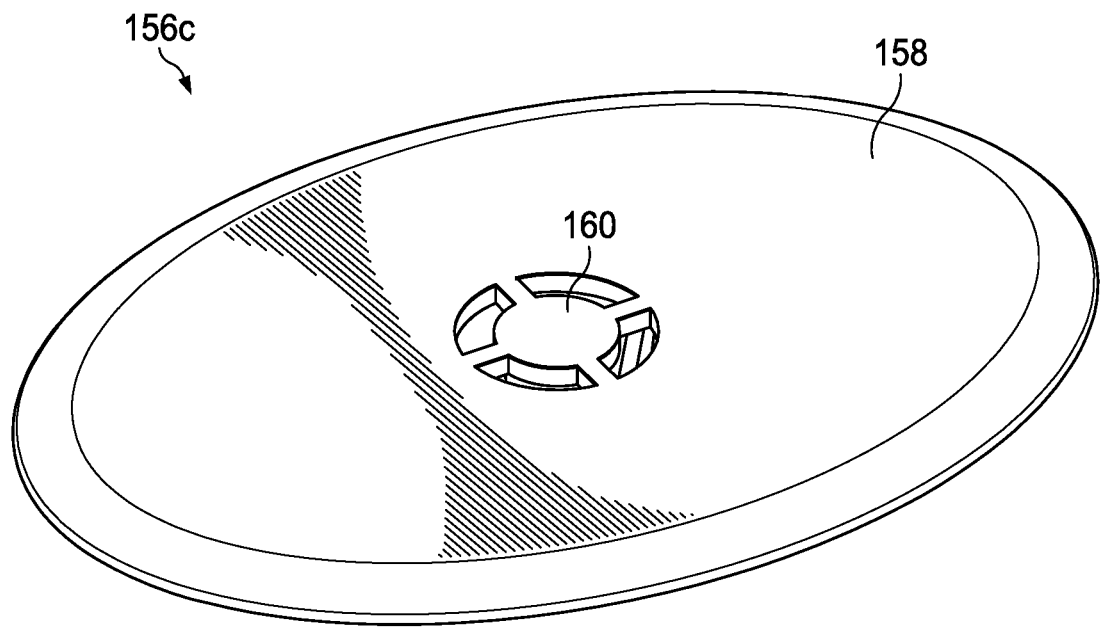
FIGS. 13A and 13B illustrate an example puck cover in accordance with certain embodiments.
Figure 13B:
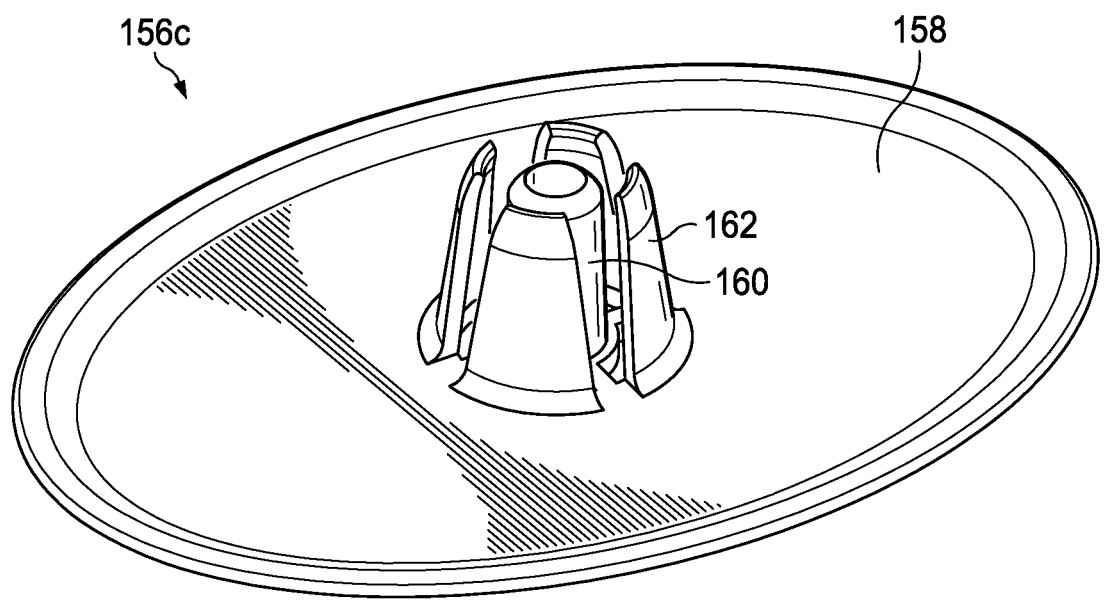

Turning to FIGS. 13A and 13B, FIGS. 13A and 13B illustrate example details of a puck cover 156c. Puck cover 156c can include top cover surface 158 and center support

160. As illustrated top cover surface 158 may have an oval profile. The oval profile may be for aesthetic purposes.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A puck configured to be embedded in a structure and a puck cover for the puck, the puck cover comprising:
   a top cover surface;
   a center support; and
   a plurality of extensions, wherein the puck includes an attachment post for coupling a removable fixture to the structure in which the puck is embedded, wherein the puck creates a cavity in the structure when the fixture is not coupled to the attachment post, wherein the puck cover covers the cavity in the structure when the fixture is not coupled to the attachment post and the plurality of extensions couple with the attachment post.

2. The puck and puck cover of claim 1, wherein the top cover surface is solid.

3. The puck and puck cover of claim 2, further comprising:
   a seal around the top cover surface.

4. The puck and puck cover of claim 1, further comprising:
   grippers under the top cover surface.

5. The puck and puck cover of claim 1, wherein the puck includes an attachment post and the plurality of extensions coupled with the attachment post.

6. The puck and puck cover of claim 5, wherein the center support is over the attachment post.

7. The puck and puck cover of claim 1, wherein the puck cover is removably coupled to the puck.

8. The puck and puck cover of claim 1, wherein a top surface of the puck cover has a curved or square profile.

9. A system comprising:
   a puck configured to be embedded in a structure, wherein the puck includes an attachment post for coupling a removable fixture to the structure in which the puck is embedded, wherein the puck creates a cavity in the structure when the fixture is not coupled to the attachment post; and
   a puck cover, wherein the puck cover covers the cavity in the structure when the fixture is not coupled to the attachment post, wherein the puck cover comprises:
      a top cover surface to cover the cavity;
      a center support; and
      a plurality of extensions, wherein the plurality of extensions coupled with the attachment post.

10. The system of claim 9, wherein the center support is over the attachment post.

11. The system of claim 9, wherein the puck cover is removably coupled to the puck.

12. The system of claim 9, wherein a top surface of the puck cover has a curved or square profile.

13. The system of claim 9, wherein the puck cover helps to prevent foreign object debris from entering the puck.

14. A rotorcraft comprising:
   a floor panel;
   one or more pucks in the floor panel, wherein each of the one or more pucks includes an attachment post for coupling to a fixture, wherein each of the one or more pucks creates a cavity in the floor panel when the puck is not coupled to the fixture; and
   a puck cover, wherein the puck cover covers the cavity in the floor panel when the puck is not coupled to the fixture and comprises:
      a top cover surface to cover the cavity;
      a center support; and
      a plurality of extensions, wherein the plurality of extensions coupled with the attachment post.

15. The rotorcraft of claim 14, wherein the top cover surface is solid.

16. The rotorcraft of claim 14, further comprising:
   a seal around the top cover surface.

17. The rotorcraft of claim 14, further comprising:
   grippers under the top cover surface.

18. The rotorcraft of claim 14, wherein the center support is over the attachment post.

19. The rotorcraft of claim 14, wherein the puck cover is removably coupled to the puck when the puck is not coupled to the fixture.

20. The rotorcraft of claim 14, wherein a top surface of the puck cover has a curved or square profile.

* * * * *